(12) United States Patent
South et al.

(10) Patent No.: US 12,342,806 B2
(45) Date of Patent: Jul. 1, 2025

(54) FISHING ROD RETAINING MECHANISM

(71) Applicant: RodKnee, LLC, West Des Moines, IA (US)

(72) Inventors: Michael Charles South, Council Bluffs, IA (US); Richard Gordon Batt, Crescent, IA (US)

(73) Assignee: RodKnee, LLC, West Des Moines, IA (US)

( * ) Notice: Subject to any disclaimer, the term of this patent is extended or adjusted under 35 U.S.C. 154(b) by 0 days.

(21) Appl. No.: 18/619,357

(22) Filed: Mar. 28, 2024

(65) Prior Publication Data

US 2025/0057137 A1    Feb. 20, 2025

Related U.S. Application Data

(60) Provisional application No. 63/519,680, filed on Aug. 15, 2023.

(51) Int. Cl.
*A01K 97/10*    (2006.01)

(52) U.S. Cl.
CPC .................................. *A01K 97/10* (2013.01)

(58) Field of Classification Search
CPC ................................ A01K 97/08; A01K 97/10
See application file for complete search history.

(56) References Cited

U.S. PATENT DOCUMENTS

| | | | | |
|---|---|---|---|---|
| 3,508,357 | A | * | 4/1970 | Collin .................... A01K 97/10 248/512 |
| 3,992,799 | A | * | 11/1976 | Oakes .................... A01K 87/00 43/25 |
| 5,950,346 | A | * | 9/1999 | da Rosa ................. A01K 97/08 43/25 |
| 2015/0040462 | A1 | * | 2/2015 | Tjeerdsma ............. A01K 87/02 43/18.1 CT |

* cited by examiner

*Primary Examiner* — Richard G Davis
(74) *Attorney, Agent, or Firm* — HOVEY WILLIAMS LLP

(57) ABSTRACT

A fishing rod retaining mechanism that eliminates the loosening of fishing line and entanglement of rod sections and tackle during transportation and/or storage includes a rod retaining section for engaging and supporting the rod sections in a spaced orientation; and a line tensioning guide for supporting and tensioning the fishing line between the first and second rod sections in a manner that prevents the fishing line from becoming entangled around the rod sections and any tackle.

17 Claims, 7 Drawing Sheets

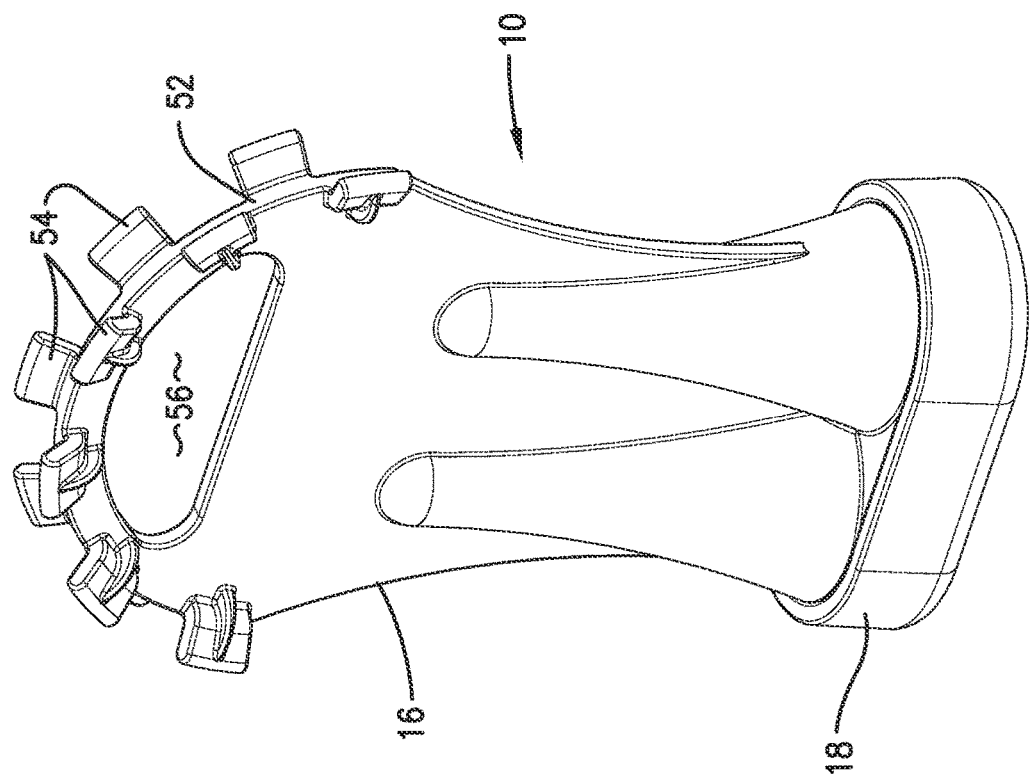
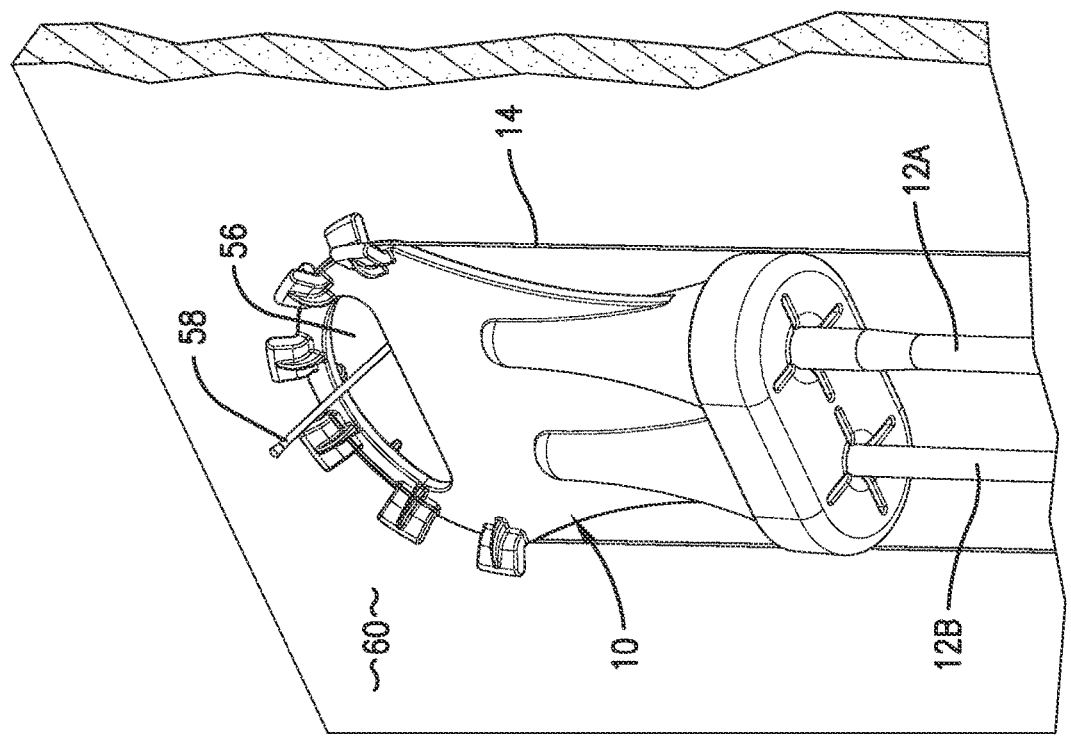

FISHING ROD RETAINING MECHANISM

RELATED APPLICATIONS

The present patent application is a non-provisional utility patent application which claims priority benefit, with regard to all common subject matter, of earlier-filed U.S. Provisional Application Ser. No. 63/519,680; titled "FISHING ROD RETAINING MECHANISM" and filed Aug. 15, 2023. The Provisional Application is hereby incorporated by reference, in its entirety, into the current patent application.

BACKGROUND OF THE INVENTION

Fishing enthusiasts often encounter challenges in keeping their fishing gear organized, accessible, and secure. Traditional tackle boxes and storage solutions may lack efficient mechanisms for accommodating fishing rods, lines, and tackle simultaneously. This can lead to time-consuming setup and potential damage to equipment during transport and storage. For example, many fishing rods have several rod sections that can be detached for easier transport and/or storage. But detaching the rod sections causes the fishing line that spans the sections to loosen and become entangled around the rod sections and any hooks, sinkers, lures, or other tackle attached to the fishing line.

SUMMARY OF THE INVENTION

The present invention solves the above-described problems and other problems by providing a fishing rod retaining mechanism that eliminates the loosening of fishing line and entanglement of rod sections and tackle during transportation and/or storage.

An embodiment of the fishing rod retaining mechanism is designed to support a fishing rod having two detachable rod sections and a fishing line spanning the rod sections, but other embodiments of the invention may support more rod sections. The fishing rod retaining mechanism broadly comprises a rod retaining section for engaging and supporting the rod sections in a spaced orientation and a line tensioning guide for supporting and tensioning the fishing line between the first and second rod sections in a manner that prevents the fishing line from becoming entangled around the rod sections and any tackle.

In some embodiments, the rod retaining section comprises a pair of adjacent conical-shaped pockets that each support and frictionally engage one of the rod sections. Each of the pockets may comprise an enlarged opening and a tapered interior wall the grips the rod sections as they are pressed into the pockets.

In some embodiments, the line tensioning guide comprises a grooved channel in which the fishing line may be inserted and a plurality of spaced guide walls surrounding the channel for guiding the fishing line into the grooved channel. The grooved channel and guide walls cooperate to keep the fishing line tensioned and unentangled from the rod sections.

Embodiments of the fishing rod retaining mechanism may further comprise an end cap for partially covering the enlarged openings of the conical-shaped pockets. The end cap comprises a pair of adjacent openings that align with the enlarged openings of the pockets, with each end cap opening comprising a pair of intersecting slits. The slits part when the rod sections are inserted through the end cap and into the pockets and frictionally engage the rod sections to prevent them from slipping out of the pockets.

Embodiments of the fishing rod retaining mechanism may further comprise a mounting hole for mounting the fishing rod mechanism on a nail or hook attached to a wall.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF DRAWING FIGURES

Embodiments of the present invention are described below with reference to the attached drawing figures. The drawing figures do not limit the present invention to the specific embodiments disclosed and described herein. The drawings are not necessarily to scale, emphasis instead being placed upon clearly illustrating the principles of the invention.

FIG. 3 is another enlarged fragmentary view of the fishing rod retaining mechanism and fishing rod shown in FIG. 1.

FIG. 4 is a perspective view of the fishing rod retaining mechanism.

DESCRIPTION OF EMBODIMENTS OF THE INVENTION

Figure 1:
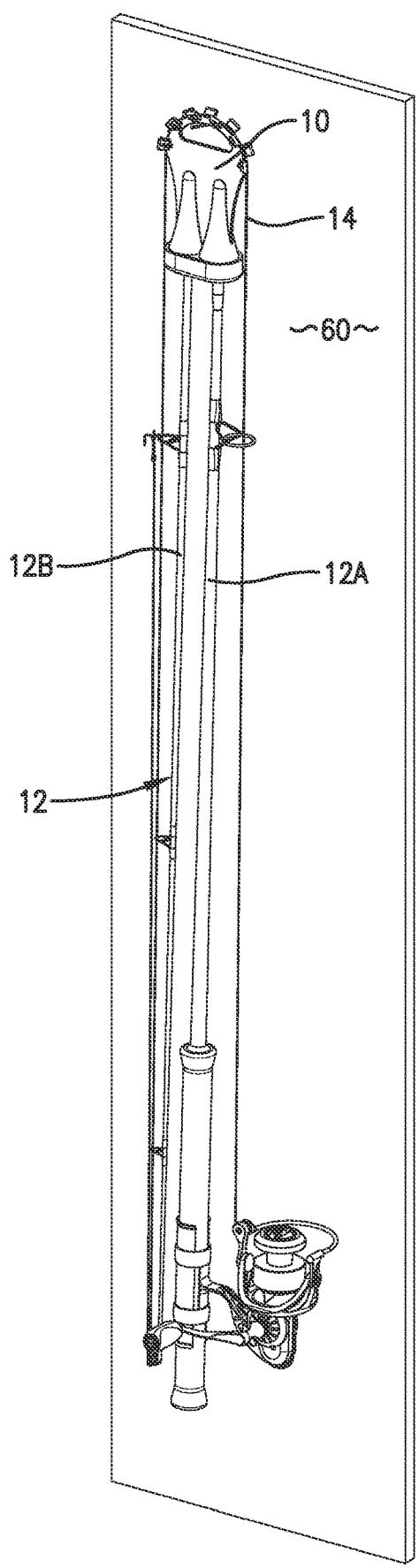
FIG. 1 is a perspective view of a fishing rod retaining mechanism constructed in accordance with an embodiment of the invention and shown supporting a fishing rod to a wall.
Figure 2:
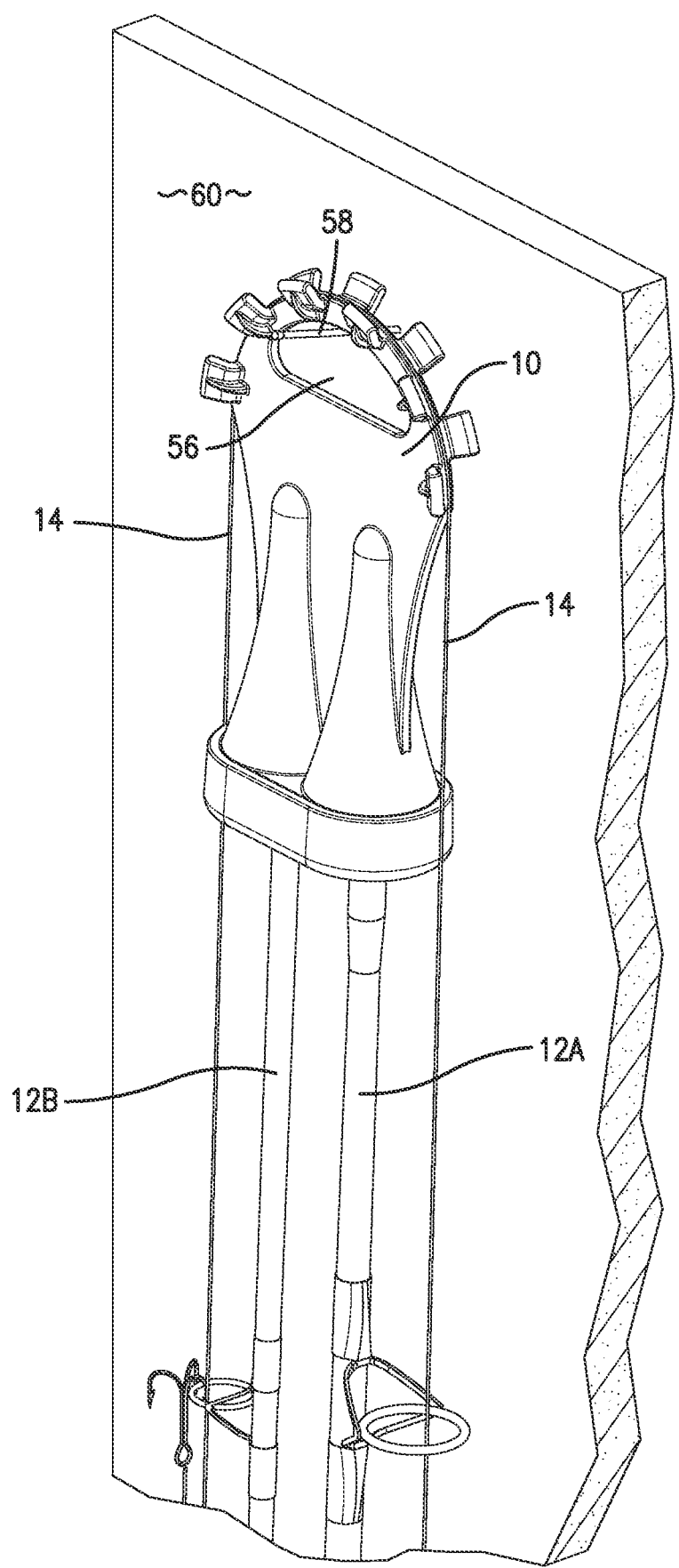
FIG. 2 is an enlarged fragmentary view of the fishing rod retaining mechanism and fishing rod shown in FIG. 1.

A fishing rod retaining mechanism 10 that secures a fishing rod and eliminates the loosening of fishing line and entanglement of rod sections and tackle during transportation and/or storage is illustrated in the attached drawing figures. As best shown in FIGS. 1 & 2, an embodiment of the fishing rod retaining mechanism 10 is designed to support a fishing rod 12 having two detachable rod sections 12A, 12B and a fishing line 14 spanning the rod sections. Other embodiments of the invention may support more rod sections.

Figure 6:
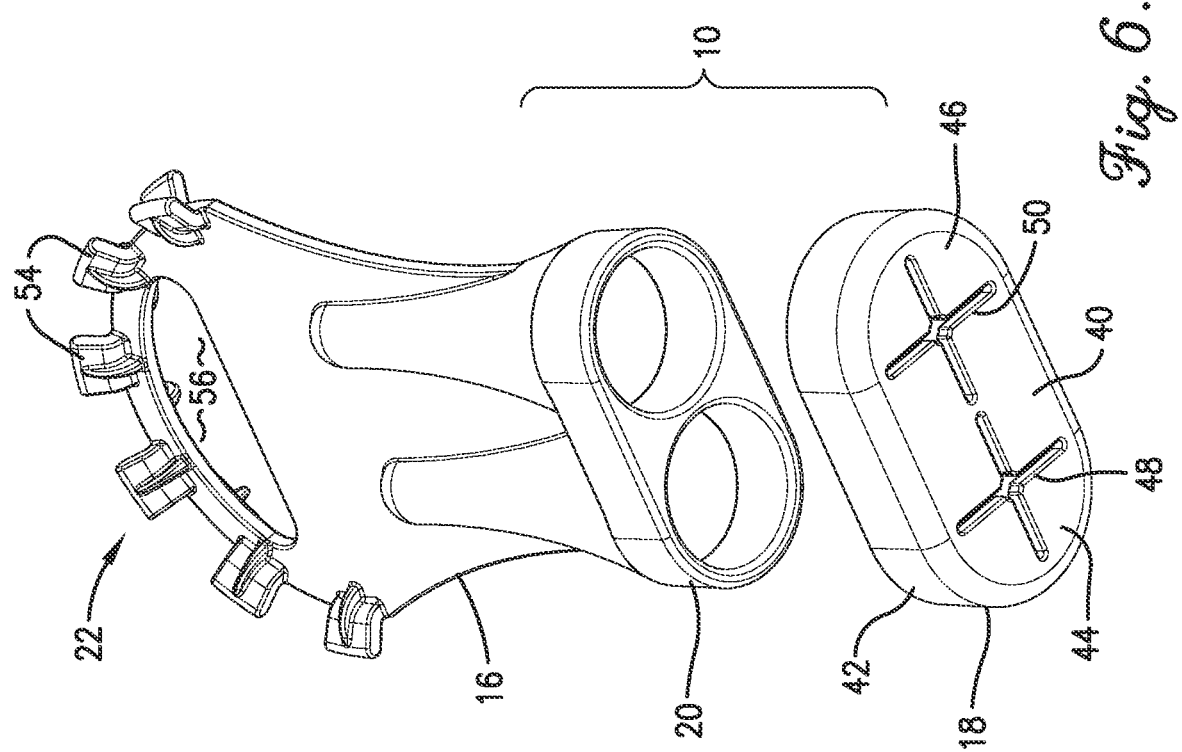
FIG. 6 is another exploded perspective view of the fishing rod retaining mechanism with its end cap removed.
Figure 5:
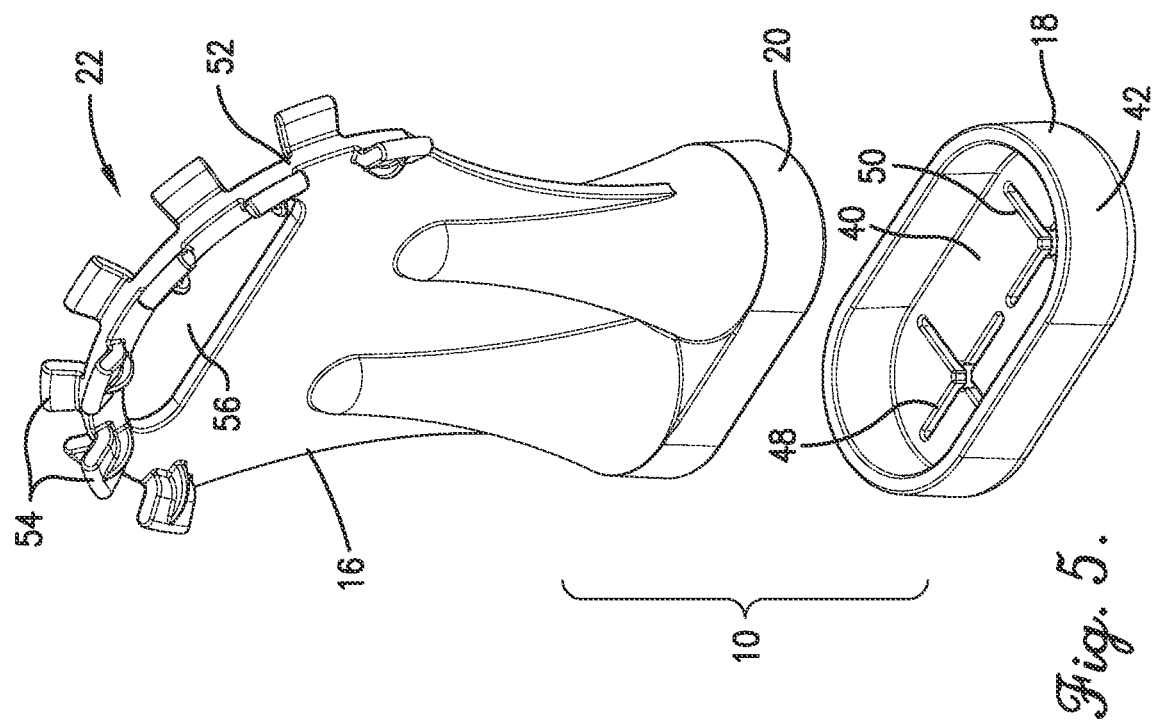
FIG. 5 is an exploded perspective view of the fishing rod retaining mechanism with its end cap removed.

As best shown in FIGS. 5 & 6, an embodiment of the mechanism 10 broadly comprises a main body section 16 and an end cap 18. The main body section 16 may be formed of any suitable materials such as plastic, rubber, or composites and may be any size or shape. One embodiment of the main body section is less than 2 inches wide, 3 inches tall, and ½ inch thick so it is easy to store and carry when not in use.

The main body section 16 has a rod retaining section 20 for engaging and supporting the rod sections in a spaced orientation and a line tensioning guide 22 for supporting and tensioning the fishing line between the first and second rod sections in a manner that prevents the fishing line 14 from becoming entangled around the rod sections and any tackle.

Figure 8:
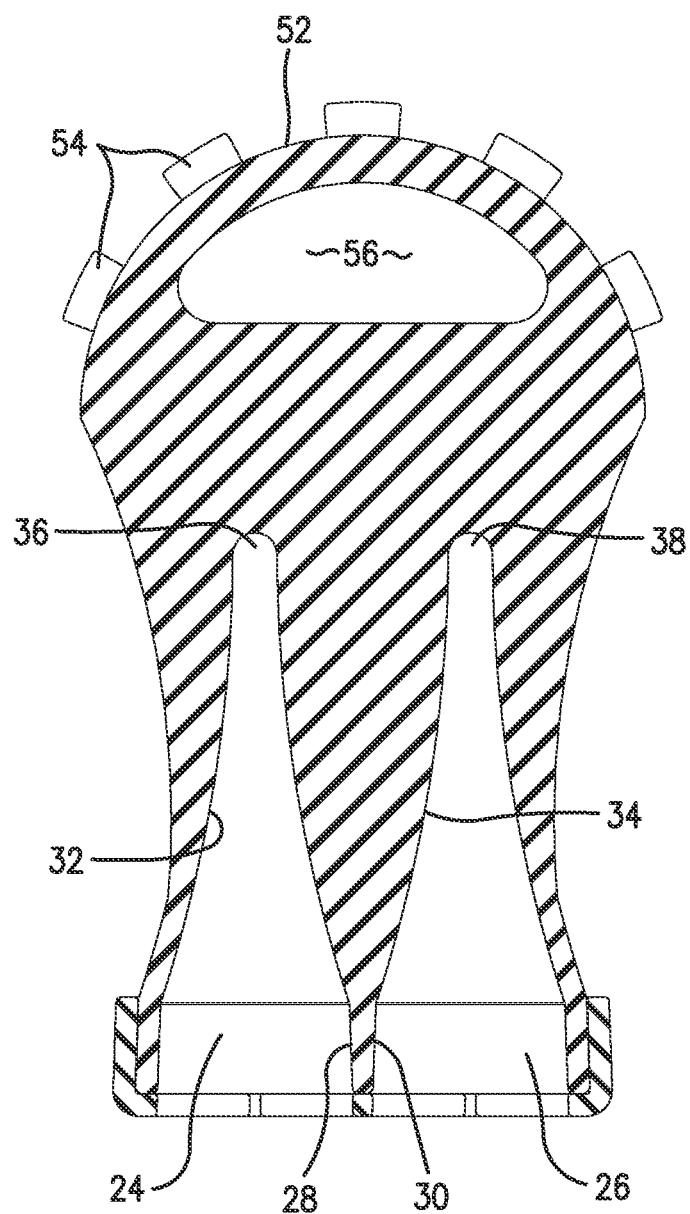
FIG. 8 is a vertical sectional view of the fishing rod retaining mechanism without a fishing rod.
Figure 9:
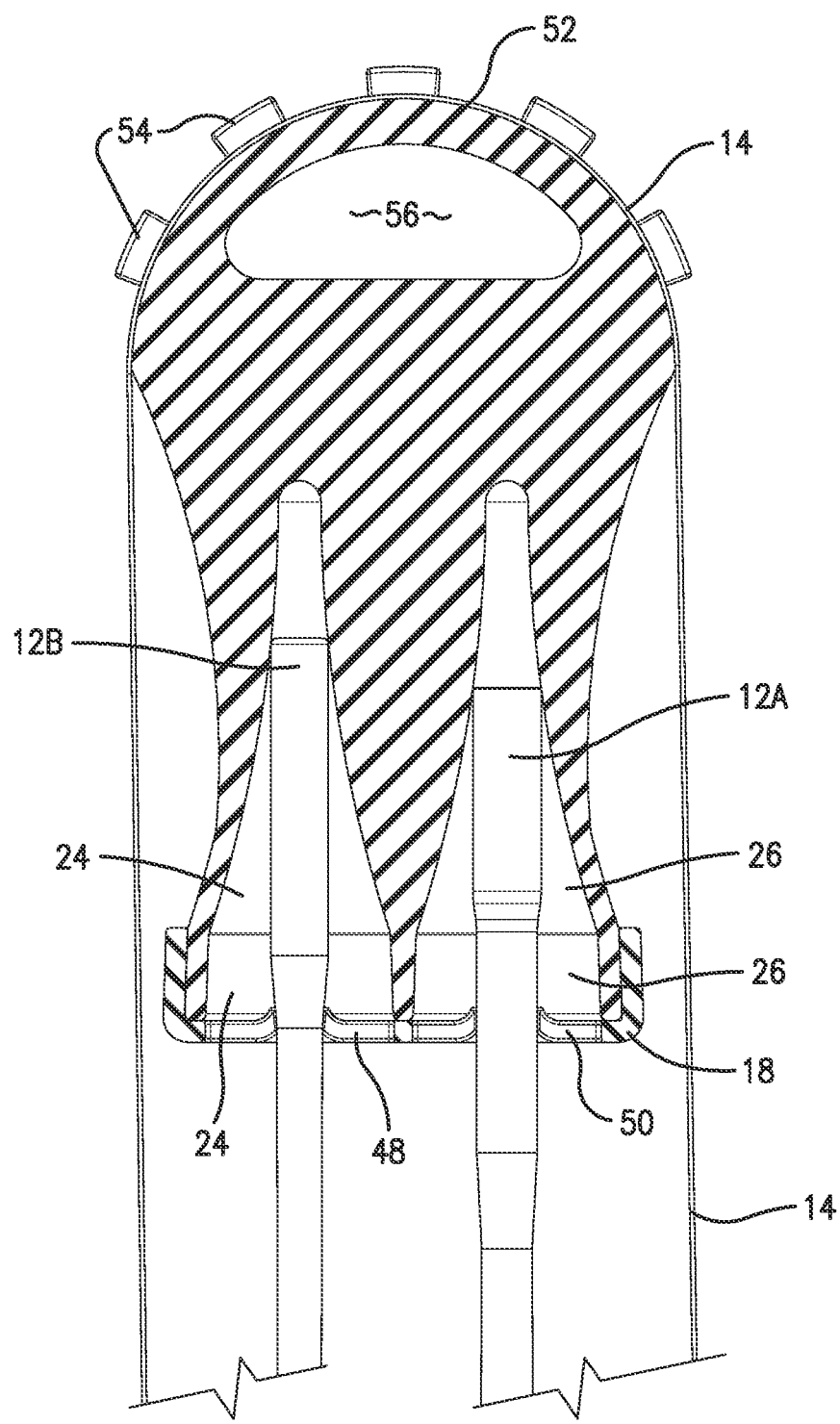
FIG. 9 is a vertical sectional view of the fishing rod retaining mechanism with a fishing rod.

As best shown in FIGS. 8 & 9, the rod retaining section 20 comprises a pair of adjacent, parallel conical-shaped pockets 24, 26 that each support and frictionally engage one of the first and second rod sections 12A, 12B. Each of the conical-shaped pockets may comprise an enlarged opening 28, 30 and a tapered interior wall 32, 34 that terminates in a narrow distal end 36, 38. The distal ends 36, 38 grip the tips of the rod sections 12A, 12B as they are pressed into the pockets 24, 26 as shown in FIG. 9.

The enlarged openings and tapered interior wall accommodate fishing rod sections of any diameter less than the diameter of the enlarged openings. In one embodiment, the enlarged openings have a diameter between 0.24"-0.9" and the distal end of the tapered interior wall has a diameter between 0.24"-0.9". The centers of the enlarged openings are preferably approximately 1 inch apart so as to adequately space the rod sections when they are inserted in the pockets.

As best shown in FIGS. 5 & 6, the end cap 18 fits over the bottom of the main body section 16 for partially covering the enlarged openings 28, 30 of the conical-shaped pockets 24, 26. The end cap 18 has a front wall 40 and a collar 42 that fits over the bottom of the main body section. A pair of adjacent openings 44, 46 are formed in the front wall in alignment with the enlarged openings of the conical-shaped pockets. Each opening is formed from a pair of intersecting slits 48, 50. The slits part when the rod sections are inserted through the end cap and into the conical-shaped pockets and frictionally engage the rod sections to prevent them from slipping out of the conical-shaped pockets. When the rod sections are inserted through the end cap, the slits exert a mechanical spring like pressure to the rod sections to better hold them in place and prevent rotation or slippage. The number of slits can be reduced or increased to allow for higher variations in the mechanical holding power of the end cap. The end cap may be formed of soft plastic, rubber or foam type material that can be easily deformed to apply the required mechanical pressure to the rod sections.

Figure 7:
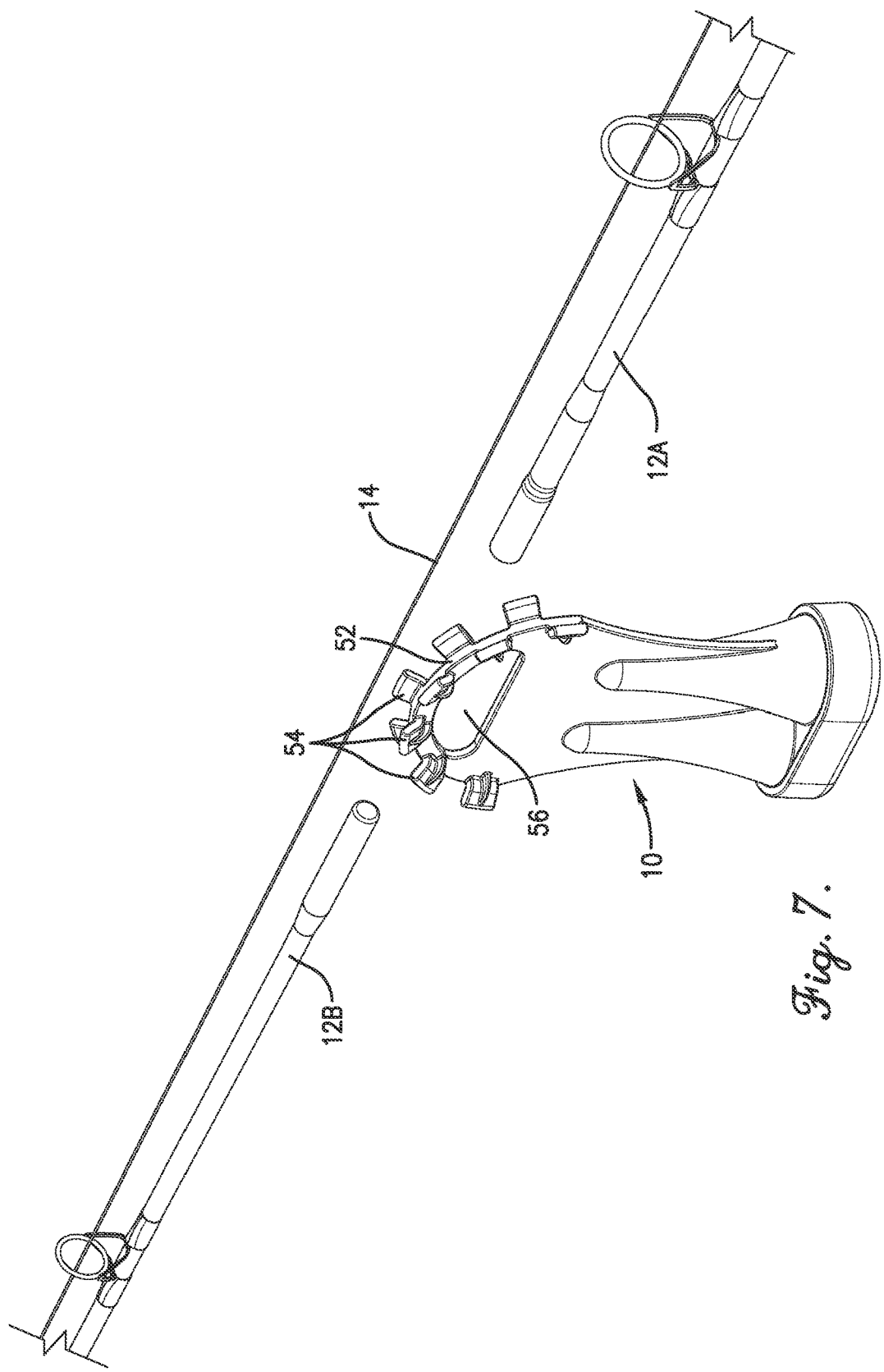
FIG. 7 is a perspective view showing a two-piece fishing rod being secured to the fishing rod retaining mechanism.

The line tensioning guide 22 keeps the fishing line 14 tensioned and unentangled from the rod sections 12A, 12B. As best shown in FIG. 7, an embodiment of the line tensioning guide 22 comprises a grooved channel 52 in which the fishing line may be inserted and a plurality of spaced guide walls 54 surrounding the channel for guiding the fishing line into the grooved channel. The grooved channel 52 preferably has an inside diameter approximately equal to the outside diameter of the fishing line 14 so that the fishing line is securely held in the channel. The shape and size of the grooved channel can be modified to accompany different sizes and types of fishing line.

Embodiments of the fishing rod retaining mechanism may further comprise a mounting hole 56 in the main body section for mounting the fishing rod mechanism on a nail 58 or hook attached to a wall 60 or other surface as shown in FIG. 3. The mounting hole 56 also serves as a finger grip for holding the mechanism 10 and attached rod sections.

Use of the fishing line retaining mechanism 10 will now be described with reference to FIGS. 7 & 9. Two detached rod sections 12A, 12B with a fishing line 14 spanning the sections may be placed over or around the mechanism 10 as shown in FIG. 7 such that the fishing line 14 is placed in the grooved slot 52. The ends of the rod sections may then be pushed through the slits 48, 50 in the end cap 18 and into the conical-shaped pockets 24, 26 until they are pushed against the distal ends 36, 38 of the pockets. Once the fishing line and rod sections are secured, any slack in the fishing line may be taken out by operating the reel attached to one of the rod sections. The tensioning of the fishing line creates a linear force normal to the openings in the conical-shaped pockets, further increasing the holding power of the rod ends into the conical shaped pockets. The mechanism and the attached rod sections may then be hung from a wall as depicted in FIG. 1.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, the legal scope of the description is defined by the words of the claims set forth at the end of any related issued patents and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims in any related issued patents are not intended to be construed under 35 U.S.C. § 112 (f) unless traditional means-plus-function language is expressly recited, such as "means for" or "step for" language being explicitly recited in the claim(s).

Having thus described various embodiments of the technology, what is claimed as new and desired to be protected by Letters Patent includes the following:

The invention claimed is:

1. A fishing rod retaining mechanism for supporting a fishing rod, the fishing rod having first and second rod sections and a fishing line spanning the first and second rod sections, the fishing rod retaining mechanism comprising:
   a rod retaining section for engaging and supporting the first and second rod sections in a spaced orientation, wherein the rod retaining section comprises a pair of adjacent conical-shaped pockets that each support and frictionally engage one of the first and second rod sections, wherein each of the conical-shaped pockets comprise an enlarged opening and a tapered interior wall, further comprising an end cap for partially covering the enlarged openings of the conical-shaped pockets; and
   a line tensioning guide for supporting and tensioning the fishing line between the first and second rod sections.

2. The fishing rod retaining mechanism of claim 1, the end cap comprising a pair of adjacent openings that align with the enlarged openings of the conical-shaped pockets.

3. The fishing rod retaining mechanism of claim 2, wherein the end cap openings each comprise a pair of intersecting slits that frictionally engage the first and second rod sections when they are supported in the conical-shaped pockets of the rod retaining section.

4. The fishing rod retaining mechanism of claim 1, the line tensioning guide comprising a grooved channel in which the fishing line may be inserted and a plurality of spaced guide walls surrounding the grooved channel for guiding the fishing line into the grooved channel.

5. The fishing rod retaining mechanism of claim 1, further comprising a mounting hole for mounting the fishing rod mechanism on a nail or hook attached to a wall.

6. A fishing rod retaining mechanism for supporting a fishing rod, the fishing rod having first and second rod sections and a fishing line spanning the first and second rod sections, the fishing rod retaining mechanism comprising:
   a rod retaining section for frictionally engaging and supporting the first and second rod sections in a spaced orientation, the rod retaining section comprising a pair of adjacent conical-shaped pockets that each support and frictionally engage one of the first and second rod sections;
   a line tensioning guide for supporting and tensioning the fishing line between the first and second rod sections, the line tensioning guide comprising a grooved channel in which the fishing line may be inserted; and
   an end cap for partially covering the enlarged openings of the conical-shaped pockets.

7. The fishing rod retaining mechanism of claim 6, wherein each of the conical-shaped pockets comprise an enlarged opening and a tapered interior wall.

8. The fishing rod retaining mechanism of claim 7, the end cap comprising a pair of adjacent openings that align with the enlarged openings of the conical-shaped pockets.

9. The fishing rod retaining mechanism of claim 8, wherein the end cap openings each comprise a pair of intersecting slits that frictionally engage the first and second rod sections when they are supported in the conical-shaped pockets of the rod retaining section.

10. The fishing rod retaining mechanism of claim 6, the line tensioning guide further comprising a plurality of spaced guide walls surrounding the grooved channel for guiding the fishing line into the grooved channel.

11. The fishing rod retaining mechanism of claim 6, further comprising a mounting hole for mounting the fishing rod mechanism on a nail or hook attached to a wall.

12. A fishing rod retaining mechanism for supporting a fishing rod, the fishing rod having first and second rod sections and a fishing line spanning the first and second rod sections, the fishing rod retaining mechanism comprising:
   a main body section comprising:
      a rod retaining section for frictionally engaging and supporting the first and second rod sections in a spaced orientation, the rod retaining section comprising a pair of adjacent conical-shaped pockets that each support and frictionally engage one of the first and second rod sections; and
      a line tensioning guide for supporting and tensioning the fishing line between the first and second rod sections, the line tensioning guide comprising a grooved channel in which the fishing line may be inserted;
   an end cap that fits over a portion of the main body section for partially covering the enlarged openings of the conical-shaped pockets; and
   a mounting mechanism for mounting the fishing rod mechanism on a nail or hook attached to a wall.

13. The fishing rod retaining mechanism of claim 12, wherein each of the conical-shaped pockets comprise an enlarged opening and a tapered interior wall.

14. The fishing rod retaining mechanism of claim 13, the end cap comprising a pair of adjacent openings that align with the enlarged openings of the conical-shaped pockets.

15. The fishing rod retaining mechanism of claim 12, wherein the end cap openings each comprise a pair of intersecting slits that frictionally engage the first and second rod sections when they are supported in the conical-shaped pockets of the rod retaining section.

16. The fishing rod retaining mechanism of claim 12, the line tensioning guide further comprising a plurality of spaced guide walls surrounding the grooved channel for guiding the fishing line into the grooved channel.

17. The fishing rod retaining mechanism of claim 12, wherein the mounting mechanism is a mounting hole formed in the main body section for mounting the fishing rod mechanism on a nail or hook attached to a wall.

\* \* \* \* \*